United States Patent [19]
Durkee et al.

[11] 3,868,864
[45] Mar. 4, 1975

[54] STEERING COLUMN MOUNTING PAD

[75] Inventors: Lyle H. Durkee, Hemlock; Lehman J. Connell, Frankenmuth, both of Mich.

[73] Assignee: General Motors Corporation, Detroit, Mich.

[22] Filed: Sept. 17, 1973

[21] Appl. No.: 398,156

[52] U.S. Cl.................................. 74/492, 248/230
[51] Int. Cl............................................... B62d 1/16
[58] Field of Search...... 248/230, 205; 74/492, 493; 118/1 C

[56] References Cited
UNITED STATES PATENTS

| | | | |
|---|---|---|---|
| 3,394,613 | 7/1968 | Curtindale | 74/492 |
| 3,621,732 | 11/1971 | Kaniut | 248/230 |
| 3,747,427 | 7/1973 | Milton et al. | 74/492 |

*Primary Examiner*—Roy D. Frazier
*Assistant Examiner*—Darrell Marquette
*Attorney, Agent, or Firm*—Saul Schwartz

[57] ABSTRACT

An improved mounting pad for an energy absorbing steering column and an improved procedure for fabricating the same from a continuous ribbon of stock, the procedure including the steps of transversely severing the ribbon to define a pad blank, piercing the blank to define a slot at each end, bending the blank into a U-shaped configuration with one slot disposed at the distal end of each leg of the U, and bending the distal end of each leg outboard through an included angle of substantially 180° so that each distal end defines a flange having an open ended channel therein. Each channel is adapted for slidably receiving the edge of a slot in a bracket on the steering column and the center of each pad is adapted for reception of a rod rigidly attached to a vehicle body so that when the pad is clamped to the rod the steering column assembly is supported on the vehicle body for movement only in an energy absorbing mode.

3 Claims, 10 Drawing Figures

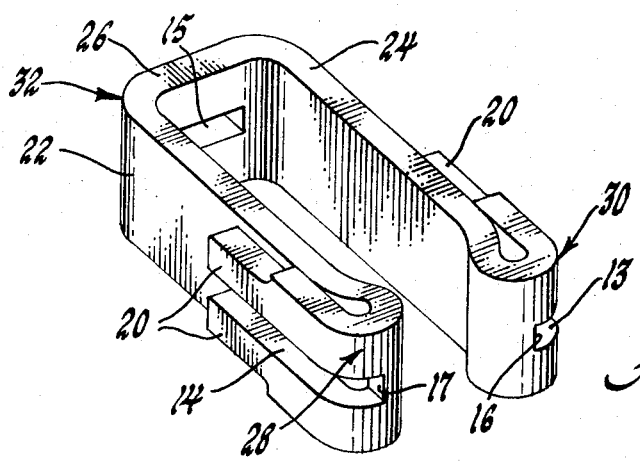
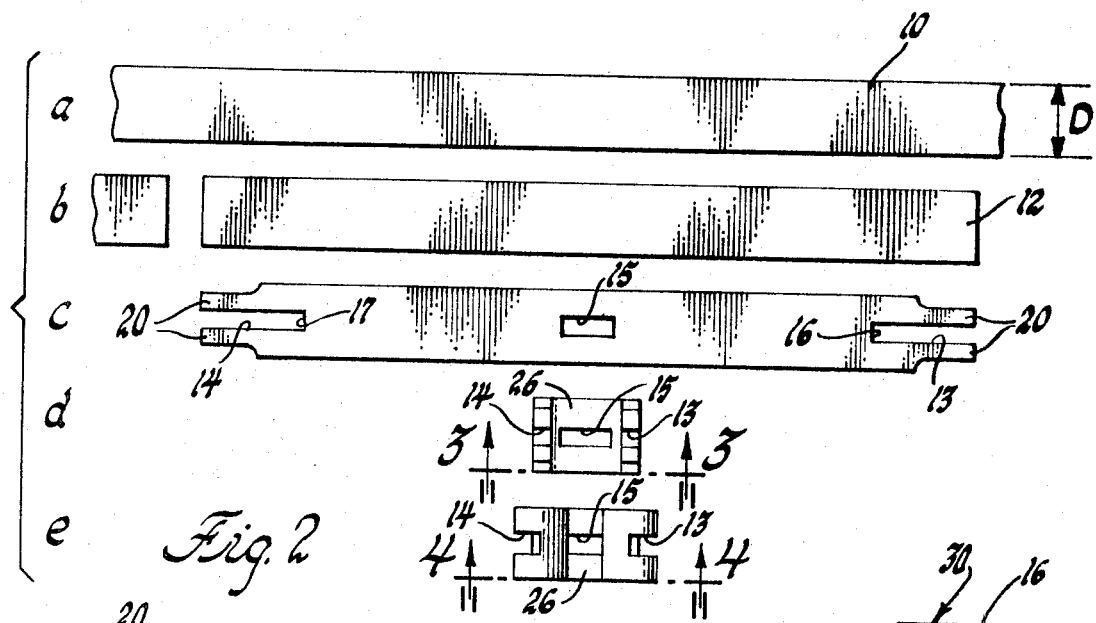
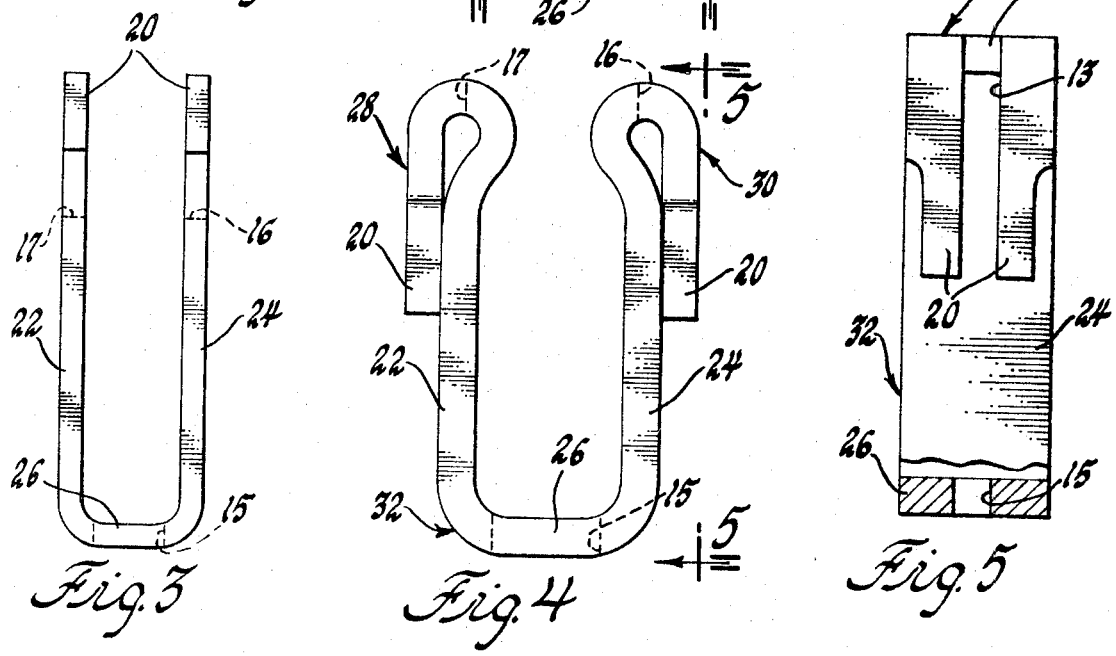

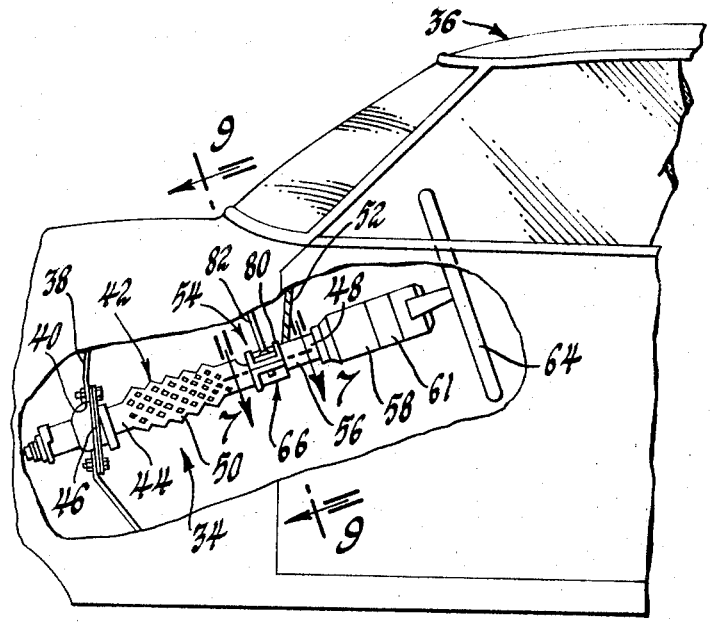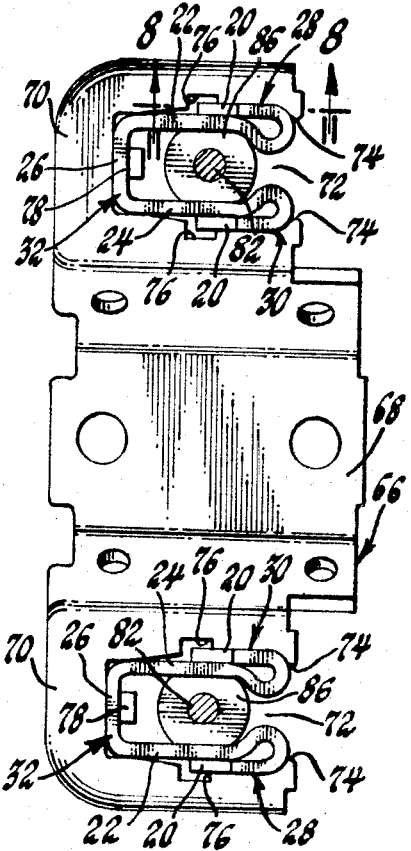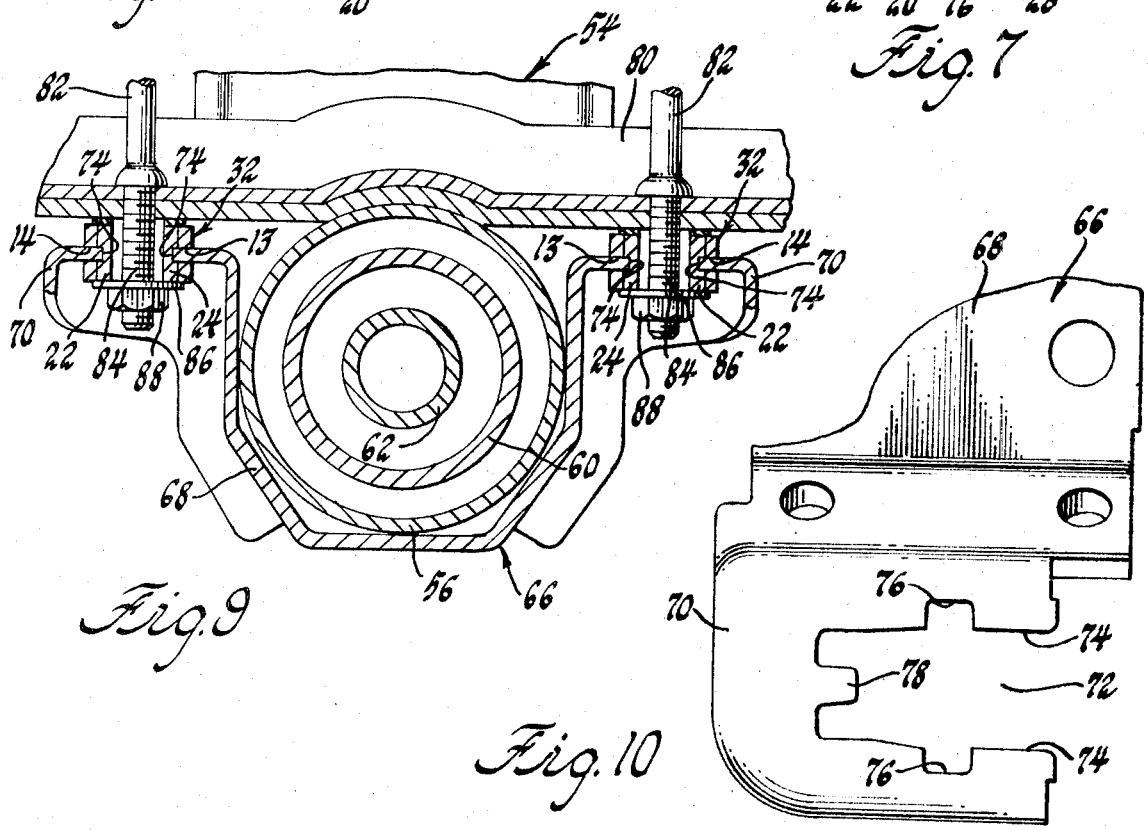

STEERING COLUMN MOUNTING PAD

This invention relates generally to automotive energy absorbing steering column installations and, more particularly, to apparatus for releasably securing together a portion of the steering column assembly and the vehicle body and to a procedure for fabricating such apparatus.

A typical automotive energy absorbing steering column installation includes a steering column assembly having a lower section adapted for anchorage on the vehicle body and an upper section which is telescopeable or otherwise bodily shiftable relative to the lower section in an energy absorbing mode. For normal operation, however, the upper section must also be secured to the vehicle body. Usually, the upper section has a bracket rigidly attached thereto which incorporates a pair of open slots. A mounting member or pad is slidably disposed in each of the slots and secured to the bracket through an injection molded plastic pin or other frangible member. Finally, a rod or other elongated fastener is received through an aperture in each pad and nuts or like fasteners rigidly clamp the pads to the rod. Thus, when the upper section of the column assembly is subjected to an impact, the plastic pins are fractured and the bracket slides relative to the pads which remain attached to the rods. A mounting pad fabricated according to this invention represents an improvement over the state of the art in terms of both simplicity of structure and fabrication economies.

The primary feature, then, of this invention is that it provides an improved procedure for fabricating a steering column assembly mounting pad and an improved mounting pad structure. Another feature of this invention is that it provides an improved procedure for fabricating a mounting pad including the steps of severing at predetermined intervals a continuous ribbon of flat stock to form a blank, piercing the blank to form a pair of slots at opposite ends of the blank, bending the blank into a generally U-shaped configuration with the slots at the ends of each leg, and bending the end of each leg outboard through an included angle of substantially 180° so that the slots are parallel to the legs and define channels for slidably supporting the pad on a steering column bracket. Yet another feature of this invention is that it provides an improved mounting pad structure including a generally U-shaped body portion defining a pair of parallel legs each having at the distal end thereof a flange disposed parallel to and in juxtaposition with the outboard surface of the corresponding one of the legs, each of the flanges having a slot parallel to the corresponding leg which defines a channel for slidably mounting the pad on the steering column bracket. A further feature of this invention resides in the provision in the improved mounting pad structure of integral crimping tangs on each of the flanges adjacent one end of each of the slots therein, the tangs being adapted for permanent deformation into an aperture in the steering column bracket for releasably securing the pad to the bracket.

These and other features of this invention will be readily apparent from the following specification and from the drawings wherein:

FIG. 1 is a perspective view of a mounting pad according to this invention;

FIG. 2 is a view depicting the successive steps which comprise the mounting pad fabrication procedure according to this invention;

FIG. 3 is an enlarged view taken generally along the plane indicated by lines 3—3 in FIG. 2;

FIG. 4 is an enlarged view taken generally along the plane indicated by lines 4—4 in FIG. 2;

FIG. 5 is a view taken generally along the plane indicated by lines 5—5 in FIG. 4;

FIG. 6 is a fragmentary partially broken away elevational view of an automobile vehicle body including an energy absorbing steering column installation incorporating a plurality of mounting pads according to this invention;

FIG. 7 is an enlarged sectional view taken generally along the plane indicated by lines 7—7 in FIG. 6;

FIG. 8 is an enlarged sectional view taken generally along the plane indicated by lines 8—8 in FIG. 7;

FIG. 9 is an enlarged sectional view taken generally along the plane indicated by lines 9—9 in FIG. 6; and FIG. 10 is a view of a portion of FIG. 7 showing the mounting pad receiving slot in a bracket portion of the steering column assembly.

Referring now to FIGS. 1 through 5 and describing the structure of a mounting pad according to this invention and the fabrication procedure therefor, a continuous ribbon 10 of plastically deformable stock, as for example cold rolled steel, of predetermined transverse dimension D, FIG. 2a, is introduced into an appropriate cold forming machine, not shown. As a first step in the fabrication procedure according to this invention, the cold forming machine transversely severs the ribbon 10 at predetermined intervals to form a plurality of planar pad blanks, only one blank 12 being shown in FIG. 2b. As seen best in FIG. 2c, the next step of the fabrication procedure the blank 12 is pierced or punched at predetermined locations so that a pair of longitudinally extending slots 13 and 14 and the aperture 15 are defined, the slots 13 and 14 having closed ends 16 and 17, respectively. The slots 13 and 14 extend in opposite directions from respective ends of the blank 12. Additionally, during this second step in the fabrication procedure, material is removed at each corner of the blank thereby to define a pair of crimping tangs 20 adjacent the open end of each slot 13 and 14.

In the next step of the fabrication procedure, FIGS. 2d and 3, the blank 12 is deformed into a generally U-shaped configuration defining a pair of parallel legs 22 and 24 interconnected at one end by a web 26. The slots 13 and 14 are disposed at the distal ends of the legs 24 and 22, respectively, and the aperture 15 is centrally located in the web 26. In the final step of the fabrication procedure, FIGS. 2e and 4 and 5, the distal end of each leg 22 and 24 is deformed or bent outboard about an axis, not shown, parallel to the plane of the corresponding one of the legs 22 and 24 through an included angle of substantially 180°. The portions of the legs 22 and 24 thus deformed define a pair of integral flanges 28 and 30 which are disposed parallel to and in juxtaposition with the corresponding ones of the legs 22 and 24.

The lengths of the flanges 28 and 30 are predetermined to insure that the closed ends 17 and 16 of the slots are disposed inboard of the planes of the corresponding ones of the legs, FIG. 4, so that the slots define open ended channels outboard of each of the legs 22 and 24. The result, then, of the fabrication procedure according to this invention is a mounting pad according to this invention and designated generally 32 the sides of which define a central rectangular aperture of depth equal to the ribbon transverse dimension D and the flanges of which define a pair of channels outboard of the sides.

Referring now to FIGS. 6 through 10 and describing the environment and operation of the pad 32, the latter is adapted for application in a generally conventional energy absorbing steering column installation 34 in an automobile type vehicle body 36. The vehicle body, shown in fragmentary partially broken away view in FIG. 6, includes interiorly thereof a rigid fire wall 38 separating the engine compartment of the vehicle from the passenger compartment. The fire wall 38 includes an aperture 40 through which projects the lower portion of an energy absorbing steering column assembly 42. The steering column assembly is generally conventional and includes a lower section 44 adapted for rigid anchorage on the fire wall 38 by a plate assembly 46 bolted to the fire wall. The steering column assembly further includes an upper section 48 connected to the lower section 44 through a corrugated metal section 50. The corrugated section 50 normally maintains the axial relationship between the upper and lower sections 48 and 44. In the event of a substantial, axially directed impact on the upper section, the corrugated section is adapted for plastic deformation which effects energy absorption and permits axial bodily movement or collapse of the upper section relative to the lower section. Rearwardly of the fire wall 38 an instrument panel structure 52 is disposed transversely across the interior of the vehicle body. Forward of the instrument panel structure is a rigid bracket assembly 54 adapted, as described hereinafter, for cooperation with a plurality of mounting pads 32 in releasably supporting the upper section 48 of the steering column assembly on the vehicle body.

As seen best in FIG. 9, the upper column section 48 includes a cylinder mast jacket 56 connected at its lower end to the corrugated section 50 and at its upper end to a hub 58. A cylindrical shift tube 60 is rotatably disposed within the mast jacket 56 for manual manipulation in a conventional manner by a shift lever, not shown, disposed on a shift bowl 61. Rotatably disposed within the shift tube 60 is a steering shaft 62 connected at its upper end to a steering handwheel 64 disposed outboard of the shift bowl 61 and at its lower end forward of the fire wall 38 to the vehicle steering gear, not shown.

Referring now to FIGS. 6, 7, 9 and 10, the mast jacket 56 has rigidly attached thereto an instrument panel bracket 66 adapted as described hereinafter for releasable connection to the bracket assembly 54 on the vehicle body. The instrument panel bracket 66 is generally U-shaped in configuration and includes a main body portion 68 embracing and rigidly attached to the mast jacket 56 and a pair of laterally spaced, outwardly extending wing flanges 70. Each wing flange has formed therein a generally rectangular slot 72 opening rearwardly with respect to the direction of axial collapse of the upper column section 48. Each slot includes a pair of side edges 74 extending generally parallel to the longitudinal axis of the steering column assembly. Each side edge 74 is interrupted intermediate its ends by an aperture 76 formed in the corresponding wing flange and opening into the slot. At the closed end of each slot 72, a tab 78 integral with the corresponding wing flange projects into the slot. The instrument panel bracket 66 is located axially along the mast jacket 56 such that in a normal or uncollapsed condition of the steering column assembly, FIGS. 6 through 9, the instrument panel bracket is disposed in juxtaposition with a flange portion 80 of the bracket assembly 54.

The bracket assembly 54 further includes a pair of laterally spaced and generally vertically oriented rods 82 which are rigidly attached to the vehicle body forward of the instrument panel structure 52 and which project downwardly through appropriate apertures in the flange portion 80 of the bracket assembly, each of the rods having a threaded portion 84 extending beyond the lower surface of the flange portion 80, FIG. 9. The slots 72 in the wing flanges 70 are adapted for registry with the threaded portion 84 of the rods so that in the uncollapsed condition of the steering column assembly the rods are disposed generally centrally in the slots, FIGS. 7 and 9.

Those skilled in the art will recognize, of course, that axial collapse of the upper column section 48 effects forward movement, FIG. 6, of the instrument panel bracket 66 relative to the flange portion 80 on the bracket assembly 54. Mounting pads 32, fabricated in accordance with this invention, function as releasable connectors between the steering column assembly 42 and the vehicle body 36 to permit vehicle control under normal circumstances and collapse of the column assembly under abnormal circumstances. More particularly, and with reference to FIGS. 1 and 6 through 10, each slot 72 in the instrument panel bracket 66 slidably receives one of the pads 32. The channels defined by the slots 13 and 14 on the pads are substantially equal in depth to the thickness of the wing flanges adjacent the slots so that the slots 13 and 14 support the pads 32 on the wing flanges for slidable movement into the slots 72 while simultaneously preventing displacement of the pads in a direction perpendicular to the upper surface of the wing flanges. As each pad 32 approaches the closed end of the corresponding one of the slots 72, the tab 78 on the bracket 66 is received in the aperture 15 in the web 26 of the pad, FIG. 7. The tabs 78 function to aid the slots 13 and 14 in positively preventing movement of any part of the pads 32 in a direction perpendicular to the upper surfaces of the wing flanges. After the pads 32 are fully seated in the slots 72, each crimping tang 20 is permanently deformed in the plane of the corresponding one of the flanges 28 and 30 into respective ones of the apertures 76, FIGS. 7 and 8. The deformed tangs 20, then, function to prevent withdrawal of the pads 32 from the instrument panel bracket until the magnitude of the force urging separation is sufficient to cam the deformed crimping tangs out of the apertures 76.

As seen best in FIGS. 6, 7 and 9, with the pads 32 installed as described and the steering column assembly in the uncollapsed condition, the rods 82 project through the apertures defined by the corresponding one of the pads 32 when the instrument panel bracket is brought into juxtaposition against the flange portion 80 of the bracket assembly 54. Threaded portion 84 on each rod receives a washer 86 and a nut 88, the washer being retained on the rod by the nut. The nuts 88 function to clamp the mounting pads tightly between the flange portion 80 and the washers 86, the flange portion engaging the top edge of each pad and the washer engaging the bottom edge of the corresponding pad. Accordingly, the pads 32 are rigidly attached to a fixed portion of the vehicle body structure and, in turn, normally rigidly connect the instrument panel bracket 66 on the steering column assembly to the vehicle body structure.

Under normal operating conditions, the steering column assembly 42, rigidly supported by the rods 82 through the pads 32, functions in a conventional manner to control the direction of the vehicle in response to manual input at the steering handwheel 64. In the event of a forwardly directed impact on the wheel 64, the upper column section 48 is urged forwardly. The pads 32, however, being rigidly clamped to the flange portion 80 of the bracket assembly 54 are restrained against similar forward movement so that, at a predetermined force level, the tangs 20 are cammed out of the apertures 76 to permit the instrument panel bracket 66 to move forward with the upper column portion, the pads 32 simultaneously sliding out of the open end of the slots 72.

Having thus described the invention, what is claimed is:

1. In a vehicle body having a rod rigidly disposed thereon and a collapsible type energy absorbing steering column assembly including a bracket member, a mounting pad for disposition between said bracket member and said rod comprising, in combination, a body portion defining an aperture bounded by a pair of parallel legs interconnected at one end by a web, an integral flange disposed on the distal end of each of said legs and oriented parallel to and in juxtaposition with the outboard surface of the corresponding one of said legs, and means on each of said flanges defining a slot extending the full length of the corresponding one of said flanges, said body portion aperture receiving therethrough said rod for rigid attachment to the latter and said slots slidably receiving said bracket member thereby to slidably support the latter on said rod while preventing movement thereof in a direction parallel to the longitudinal axis of said rod.

2. A mounting pad as recited in claim 1 further including means on each of said flanges defining a pair of integral crimping tangs adjacent one end of the corresponding one of said slots, each of said crimping tangs being permanently deformable in the plane of the corresponding one of said flanges into an aperture in said bracket member for securing said pad to said bracket member.

3. In a vehicle body having a rod rigidly disposed thereon and a collapsible type energy absorbing steering column assembly including a bracket member, a mounting pad for disposition between said bracket member and said rod comprising, in combination, a body portion defining an aperture bounded by a pair of parallel legs interconnected at one end by a web, an integral flange disposed on the distal end of each of said legs and oriented parallel to and in juxtaposition with the outboard surface of the corresponding one of said legs, means on each of said flanges defining a slot extending the full length of the corresponding one of said flanges, said body portion aperture receiving therethrough said rod for rigid attachment to the latter and said slots slidably receiving said bracket member thereby to slidably support the latter on said rod while preventing movement thereof in a direction parallel to the longitudinal axis of said rod, means on said body portion defining an aperture in said web adapted for reception of a tab on said bracket member thereby to prevent relative movement between said rod and said bracket member adjacent said web, and means on each of said flanges defining a pair of integral crimping tangs adjacent one end of the corresponding one of said slots, each of said crimping tangs being permanently deformable in the plane of the corresponding one of said flanges into an aperture in said bracket member for securing said pad to said bracket member.

* * * * *